No. 844,630. PATENTED FEB. 19, 1907.
R. TEMPLE.
SPEED CONTROLLER FOR ELECTRIC MOTORS.
APPLICATION FILED APR. 24, 1906.

3 SHEETS—SHEET 1.

Witnesses:
Inventor:
Robert Temple,
By Thomas F. Sheridan,
Atty.

Inventor:
Robert Temple,
By Thomas F. Sheridan,
Atty.

No. 844,630. PATENTED FEB. 19, 1907.
R. TEMPLE.
SPEED CONTROLLER FOR ELECTRIC MOTORS.
APPLICATION FILED APR. 24, 1906.

3 SHEETS—SHEET 3.

Witnesses:
Inventor:
Robert Temple,
By Thomas F. Sheridan
Atty.

UNITED STATES PATENT OFFICE.

ROBERT TEMPLE, OF DENVER, COLORADO.

SPEED-CONTROLLER FOR ELECTRIC MOTORS.

No. 844,680.          Specification of Letters Patent.          Patented Feb. 19, 1907.

Application filed April 2, 1906. Serial No. 319,345.

*To all whom it may concern:*

Be it known that I, ROBERT TEMPLE, a citizen of the United States, residing in the city and county of Denver, State of Colorado, have invented certain new and useful Improvements in Speed-Controllers for Electric Motors, of which the following is a specification.

My invention relates to speed-controllers, and has for its object to produce a device of this character which will be simple, efficient, and positive in operation, at the same time exceedingly strong and able to withstand rough usage.

To this end my invention consists in the combinations and details hereinafter described and claimed.

Figure 1:
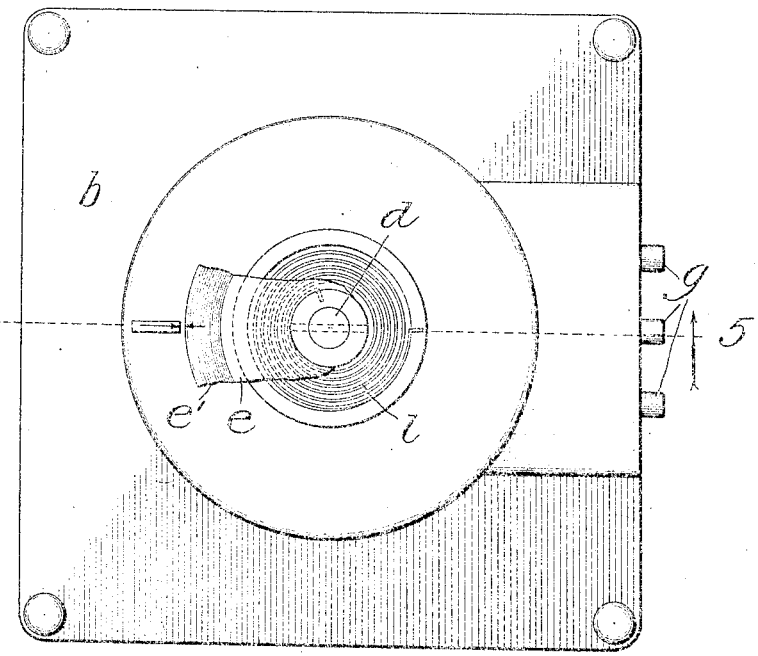
Figure 2:
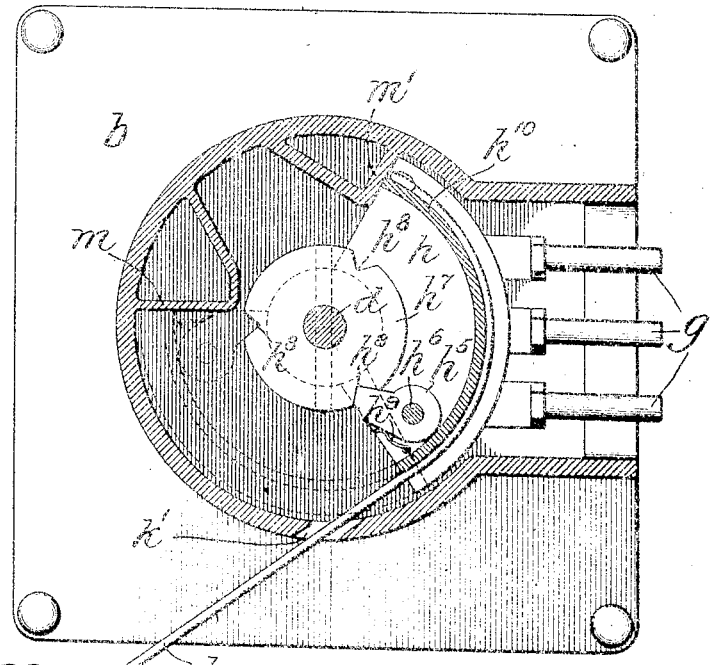
Figure 3:
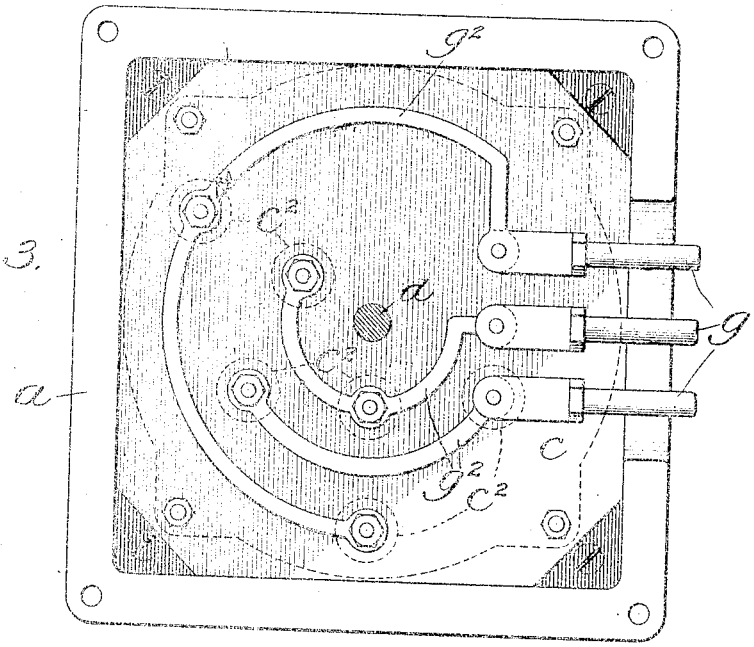
Figure 4:
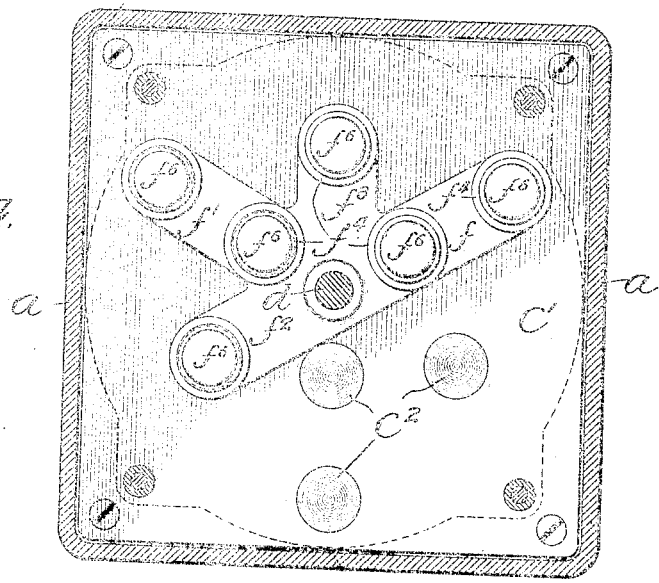
Figure 5:
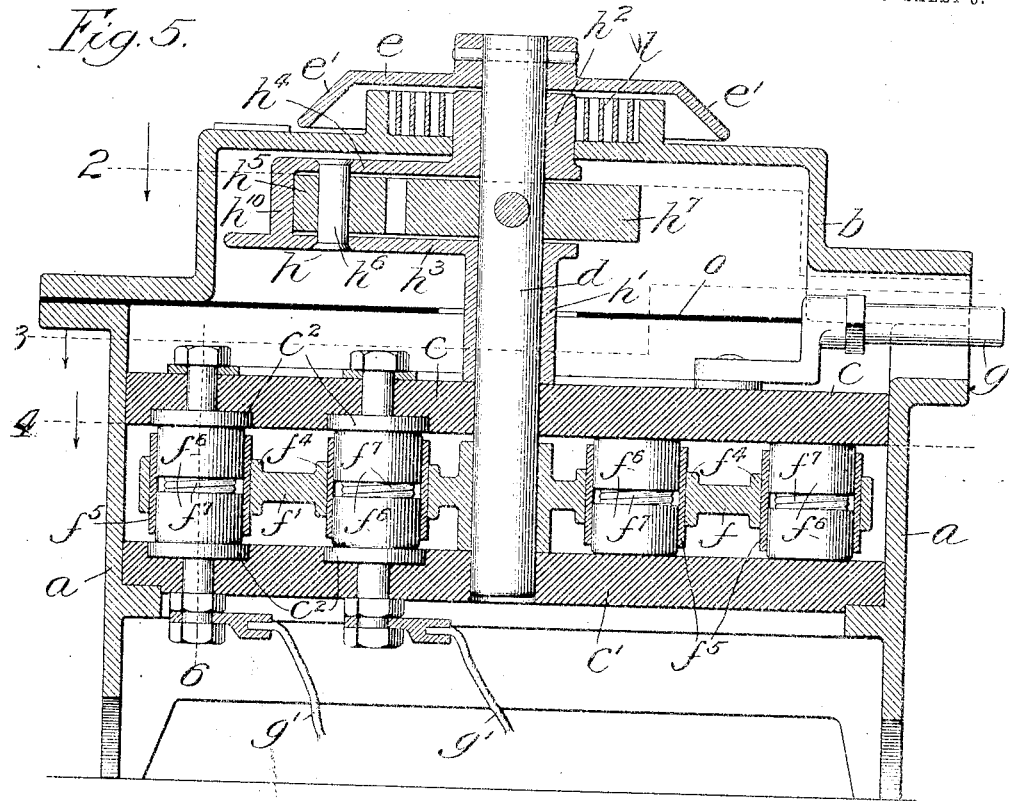
Figure 6:
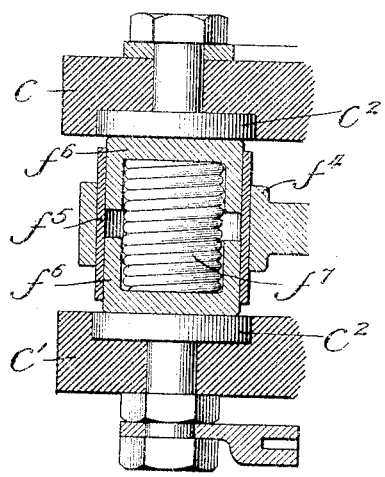

In the drawings, Figure 1 is a top plan view of my improved speed-controller. Fig. 2 is a transverse section of my controller, taken on the line 2 of Fig. 5. Fig. 3 is a transverse section on the line 3 of Fig. 5. Fig. 4 is a transverse section on the line 4 of Fig. 5. Fig. 5 is a sectional elevation on the line 5 of Fig. 1. Fig. 6 is a detail section showing the contacts.

In the drawings I show a stationary casing comprising a lower section $a$, generally rectangular in form, and an upper section $b$, suitably secured thereto, the lower section forming a housing for the contacts and the upper section a housing for the operating mechanism, as hereinafter described. Mounted in the lower section or housing are two plates of insulating material $c$ $c'$, extending entirely across the housing, these plates being spaced apart a suitable distance, as clearly shown in Fig. 5. The plates $c$ $c'$ may be made of any suitable insulating material, such as fiber, and they are provided at suitable points with contact devices $c^2$, shown in the form of round plates, set in recesses in the surface of the fiber plates so as to be flush therewith. There may be any number of these contact-points, as will be hereinafter described. The upper contacts $c^2$ are suitably connected with the conductors $g$, leading from the generator, while the lower contacts are suitably connected to conductors $g'$, leading to the motor. The connections from the generator-conductors are shown in detail in Fig. 3. The particular arrangement, however, forms no part of my invention and need not be more specifically described.

$d$ represents a vertical shaft mounted centrally of the device passing through the upper and lower insulating plates. This shaft is provided at its upper end with a housing $e$, having depending flanges $e'$, which surround and inclose the spring-casing hereinafter described. Near its lower end this shaft carries a series of contact-arms, a suitable number being provided to carry the contact devices. In the present instance I have shown four arms $f$, $f'$, $f^2$, and $f^3$. These contact-arms are provided at suitable points with integral collars $f^4$, in which are supported cylinders $f^5$ of insulating material, and in these cylinders are supported separated contact-buttons $f^6$, there being upper and lower contact-buttons engaging, respectively, upper and lower contact-plates $c^2$. These contact-buttons are spaced apart and forced into contact with the surfaces of the upper and lower insulating plates or of the contact-plates by springs $f^7$.

It will now be understood that when the contact-arms are rotated into proper position to bring the contact-buttons into engagement with the contact-plates the current will pass through the upper plates, the upper buttons, the spring, the lower buttons, the lower plates, to the conductors $g'$ and to the motor. It will be observed that the current is carried through the spring, which should be made heavy enough for this purpose. The arrangement of contact-plates in the upper insulated plate and of the contact-plates in the lower insulated plate is the same, so that corresponding plates may be connected by corresponding contact-buttons. It will be understood that by rotating the contact-arms so as to bring different sets of contact-buttons into engagement with different sets of contact-plates, the speed of the motor may be varied, owing to the variation in the current or its different connections to the terminals of the motor. The device shown in the drawings is arranged for a three-phase alternating-current changeable-pole two-speed motor, though this may be changed, as will be readily understood.

In the upper housing or casing $b$, which is separated from the lower housing by a sheet of insulating material $o$, as indicated in Fig. 5, I mount the mechanism for operating the controller. This mechanism comprises a casing $h$, loosely mounted upon the vertical shaft $d$. This casing comprises lower and upper collar portions $h'$ $h^2$, respectively, surrounding the shaft. Between these collar portions is a segmental housing, having a lower plate $h^3$, an upper plate $h^4$, and a segmental wall $h^5$, as shown in Figs. 2 and 5.

Between the upper and lower plates of this housing is pivoted a pawl $h^5$ upon a pivot $h^6$, this pawl being spring-pressed by a spring $h^9$. This pawl is adapted to engage one of a series of notches in a ratchet $h^7$, which is secured to the rotating shaft, the notches being indicated at $h^8$ in Fig. 2. Connected to the exterior of the segmental wall $h^{10}$ is a flexible operating cord or chain $k$, passing through an opening $k'$ in the stationary casing, to be readily grasped by the operator. The spring $l$ is connected to the stationary casing at one end and to the collar $h^2$ of the loosely-mounted housing at its other end. This spring tends to return the housing and the pawl pivoted therein to its initial position. (Shown in Fig. 2.) It will now be understood that by pulling on the cord $k$ the operator will cause the loosely-mounted housing to travel around the vertical shaft, and by reason of the engagement of the pawl $h^5$ with one of the notches in the ratchet-wheel, which is fixed to the shaft, it will cause the shaft to rotate, carrying with it the contact-arms fixed at its lower end. In order to provide for the positive operation of this segmental housing and to insure its stopping at the proper point to bring the contact-buttons in engagement with proper contact-plates, I provide a stop $m$, forming part of the stationary casing. It will be observed that this stop $m$ engages not only the end of the segmental casing, but also engages the pawl at the same time, thus stopping the movement of the casing and pawl and preventing the pawl from withdrawing from its notch, holding the parts at the proper point to insure the engagement between the contact buttons and plates. A similar stop $m'$ engages the opposite end of the segmental housing to stop it on its return to normal position.

The operation of my device will now be understood. Let it be supposed that the parts as shown in Fig. 4 are in normal inoperative position and it is desired to start the motor. The operator by pulling on the cord will cause the segmental housing and the pawl $h^5$, carried thereby, to travel around the vertical shaft until the pawl and housing are stopped by the stop $m$. Through the engagement of the pawl with the notched ratchet the shaft will be caused to rotate correspondingly, carrying the contact-arms around into position to make the proper contacts for the first speed. Upon releasing the cord the housing and pawl are automatically returned by the spring to their initial position, leaving the contact-points at first position. On repeating the operation the contact-buttons will be brought into proper position for the second speed. It will be observed that the operating parts must return to their initial position each time the speed is to be changed and that there is a forced stop after each change in speed before the next change can be made. By mounting the contact-buttons as shown and described they are caused during their movement from one position to another to engage and rub against the plates between which they are mounted. This operation keeps the contacts free from dirt or dust and insures a clean contact, an advantage which will readily be appreciated.

My device is exceedingly simple. The parts are strongly constructed, and it will withstand much hard usage, it being especially intended for use in mining machinery for controlling the speed of motors, rock-drills, and devices of that character.

I claim—

1. A speed-controller comprising separated insulating-plates provided with spaced contact devices and a rotatable arm mounted between the plates, said arm being provided with correspondingly-spaced contact-buttons arranged in pairs and provided with a coiled spring for holding the buttons against the plates.

2. A speed-controller comprising separated insulating contact-plates provided with contact devices, a rotatable arm mounted between the plates, said arm carrying separated contact-buttons, and a coil-spring conductor mounted between the buttons acting to force the buttons against the contact-plates and the contact devices carried thereby.

3. A speed-controller comprising separated insulating contact-plates having contact devices, contact-arms rotatably mounted adjacent the plates, a shaft on which the contact-arms are mounted, a device for rotating the shaft step by step and means for returning such device to its normal position.

4. A speed-controller comprising contact-plates, contact-arms rotatably mounted adjacent the plates, a rotating shaft on which the contact-arms are mounted, a ratchet-wheel secured to the shaft, a segmental housing loosely mounted on the shaft embracing the ratchet-wheel, a spring-pressed pawl pivoted in the housing engaging the ratchet-wheel, means for rotating the housing to advance the ratchet-wheel, and means for returning the housing to initial position.

5. A speed-controller comprising rotatable contact devices, a shaft upon which the contact devices are mounted, means for advancing the shaft step by step, means for stopping the shaft at the end of each step, and means for returning the shaft-advancing means to initial position after each advance movement of the shaft.

6. A speed-controller comprising rotatable contact devices, a shaft upon which the contact devices are mounted, a ratchet-wheel secured to the shaft, a segmental housing loosely mounted on the shaft, a pivoted spring-pressed pawl in the housing engaging the ratchet-wheel, a fixed stop engaging both the housing and the pawl at the end of its predetermined advance movement, means for operating the housing, and means for returning the housing to initial position.

7. A speed-controller comprising a fixed casing, rotatable contact devices mounted therein, a shaft upon which the contact devices are mounted, a ratchet-wheel secured to the shaft, a segmental housing loosely mounted on the shaft, a pivoted spring-pressed pawl in the housing engaging the ratchet-wheel, a fixed stop engaging both the housing and the pawl at the end of the predetermined advance movement, means for operating the housing, and a spring engaging the housing and the fixed casing for returning the housing to initial position.

ROBERT TEMPLE.

Witnesses:
 FREDRIC JOHN PALMA,
 FRANK ALLEN LEWIS